(12) United States Patent
Ohtsuka (10) Patent No.: US 10,742,946 B2
(45) Date of Patent: Aug. 11, 2020

(54) IMAGING APPARATUS

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/223,537

(22) Filed: Dec. 18, 2018

(65) Prior Publication Data

US 2019/0124311 A1 Apr. 25, 2019

Related U.S. Application Data

(63) Continuation of application No. PCT/JP2018/014516, filed on Apr. 5, 2018.

(30) Foreign Application Priority Data

Aug. 28, 2017 (JP) .................................. 2017-163312

(51) Int. Cl.
*H04N 9/802* (2006.01)
*H04R 3/00* (2006.01)
(Continued)

(52) U.S. Cl.
CPC ............. *H04N 9/802* (2013.01); *G03B 31/00* (2013.01); *G11B 27/031* (2013.01); *H04N 5/77* (2013.01);
(Continued)

(58) Field of Classification Search
CPC ........ G03B 31/00; G11B 27/031; H04N 5/77; H04N 9/802; H04R 1/406; H04R 5/027;
(Continued)

(56) References Cited

U.S. PATENT DOCUMENTS

2008/0002948 A1\* 1/2008 Murata .................. H04S 1/005
386/338
2010/0074449 A1 3/2010 Tabata
(Continued)

FOREIGN PATENT DOCUMENTS

JP 2003-504673 2/2003
JP 2003-259172 9/2003
(Continued)

OTHER PUBLICATIONS

The Extended European Search Report dated Jun. 27, 2019 for the related European Patent Application No. 18803849.1.
(Continued)

*Primary Examiner* — Loi H Tran
(74) *Attorney, Agent, or Firm* — Renner, Otto, Boisselle & Sklar, LLP (57) ABSTRACT

Imaging apparatus (100) includes selectors (115, 120) that select sound signals having a set number of channels, and a control unit. When a number of channels is set to two at time of recording sound signals, the control unit, according to a first format, records sound data generated based on selected sound signals for two channels, on one sound track included in a video file. When the number of channels is set to four, the control unit, does not record two pieces of sound data respectively on two sound tracks included in one video file in accordance with the first format.

8 Claims, 8 Drawing Sheets

(51) Int. Cl.
- *H04R 5/027* (2006.01)
- *H04S 3/00* (2006.01)
- *H04S 7/00* (2006.01)
- *G03B 31/00* (2006.01)
- *G11B 27/031* (2006.01)
- *H04N 5/77* (2006.01)
- *H04R 1/40* (2006.01)

(52) U.S. Cl.
CPC ............ *H04R 1/406* (2013.01); *H04R 3/005* (2013.01); *H04R 5/027* (2013.01); *H04S 3/006* (2013.01); *H04S 7/30* (2013.01); *H04R 2201/401* (2013.01); *H04S 2400/15* (2013.01)

(58) Field of Classification Search
CPC ... H04R 2201/401; H04R 3/005; H04S 3/006; H04S 7/30; H04S 2400/15
USPC ........................................................ 386/285
See application file for complete search history.

(56) References Cited

U.S. PATENT DOCUMENTS

| | | | |
|---|---|---|---|
| 2010/0081487 A1* | 4/2010 | Chen | .................. G10L 21/0208 455/575.1 |
| 2015/0317981 A1* | 11/2015 | Yliaho | ..................... H04S 7/30 381/26 |
| 2017/0180860 A1* | 6/2017 | Heinrich | ................ H04R 1/086 |
| 2019/0124311 A1 | 4/2019 | Ohtsuka | |

FOREIGN PATENT DOCUMENTS

| | | |
|---|---|---|
| JP | 2006-135503 | 5/2006 |
| WO | 2001/004871 | 1/2001 |
| WO | 2014/090277 A1 | 6/2014 |

OTHER PUBLICATIONS

International Search Report of PCT application No. PCT/JP2018/014516 dated Jun. 26, 2018.
The Extended European Search Report dated Feb. 13, 2020 for the related European Patent Application No. 18803849.1.

* cited by examiner

| VIDEO FILE | VIDEO FILE | SOUND FILE |
|---|---|---|
| FORMAT | FIRST FORMAT | THIRD FORMAT |
| SOUND TRACK | FIRST SOUND TRACK | SECOND SOUND TRACK |
| SOUND DATA | FIRST SOUND SIGNALS (FIRST SOUND DATA) | SECOND SOUND SIGNALS (SECOND SOUND DATA) |
| NUMBER OF CHANNELS | 2 CH | 2 CH |
| IMAGE TRACK | FIRST IMAGE TRACK | |
| IMAGE DATA | IMAGE DATA A | |
| NAME OF VIDEO FILE | 100010.mp4 | 100010.wav |

FIG. 9

| VIDEO FILE | FIRST VIDEO FILE | SECOND VIDEO FILE |
|---|---|---|
| FORMAT | FIRST FORMAT | FOURTH FORMAT |
| SOUND TRACK | FIRST SOUND TRACK | SECOND SOUND TRACK |
| SOUND DATA | FIRST SOUND SIGNALS (THIRD SOUND DATA) | SECOND SOUND SIGNALS (FOURTH SOUND DATA) |
| NUMBER OF CHANNELS | 2 CH | 2 CH |
| IMAGE TRACK | FIRST IMAGE TRACK | SECOND IMAGE TRACK |
| IMAGE DATA | FIRST IMAGE DATA | NULL (SECOND IMAGE DATA) |
| NAME OF VIDEO FILE | 100010.mp4 | 10001A.mp4 |

IMAGING APPARATUS

TECHNICAL FIELD

The present disclosure relates to an imaging apparatus capable of recording sounds.

BACKGROUND ART

PLT1 discloses a sound recording apparatus having a plurality of microphones. This sound recording apparatus can record sounds, using four channels (hereinafter "4 ch") at maximum. The sound recording apparatus includes a first microphone, a second microphone having a rotary mechanism rotatable relative to a device body, recording means capable of recording sounds captured by the first and second microphones in a plurality of recording modes, and switching means that switches a recording mode depending on a direction of rotation of the second microphone. According to the sound recording apparatus, for example, when the second microphone is directed rearward, a 2 ch stereo-recording mode can be switched to a 4 ch surround-recording mode. This facilitates recording mode switching.

CITATION LIST

Patent Literature

PTL 1: Unexamined Japanese Patent Publication No. 2006-135503

SUMMARY OF THE INVENTION

Recently, contents production by editing a video shot by an imaging apparatus has been growing popular. Video editing may involve sound editing.

An imaging apparatus according to one aspect of the present disclosure includes a setting unit that accepts setting of a number of channels for sound signals to be recorded, a selector that selects the sound signals having the number of channels, and a control unit that controls recording of the selected sound signals.

The control unit is configured to operate at time of recording the sound signals such that when the number of channels is set to two, the control unit, according to a first format, records sound data generated based on the selected sound signal for two channels, on one sound track included in a video file. The control unit is configured also to carry out, at time of recording the sound signals, at least any one of the following operations (i) to (iii) when the number of channels is set to four.

(i) The control unit, according; to a second format different from the first format, records sound data generated based on the selected sound signals for four channels, respectively, on four sound tracks included in a video file so that each piece of the sound data for one channel is allocated to a corresponding one of the sound tracks.

(ii) The control unit, according to the first format, records first sound data generated based on one set of sound signals for two channels selected out of sets of the selected sound signals for four channels, on one sound track included in a video file. The control unit, according to a third format different from the first format, records also second sound data generated based on an other set of sound signals for two channels selected out of the sets of the selected sound signals for four channels, in a sound file.

The control unit, according to the first format, records third sound data generated based on one set of sound signals for two channels selected out of sets of the selected sound signals for four channels, in a first video file such that the third sound data is associated with first image data. The control unit, according to a fourth format different from the first format, records also fourth sound data generated based on an other set of sound signals for two channels selected out of the sets of the selected sound signals for four channels, in a second video file such that the fourth sound data is associated with second image data different from the first image data.

An imaging apparatus according to another aspect of the present disclosure includes a setting unit that accepts setting of a number of channels for sound signals to be recorded, a selector that selects the sound signals having the number of channels, and a control unit that controls recording of the selected sound signals.

The control unit is configured to operate at time of recording the sound signals such that when the number of channels is set to two, the control unit, according to a first format, records sound data generated based on the selected sound signals for two channels, on one sound track included in a video file.

The control unit is configured not to operate such that when the number of channels is set to four, the control unit records first sound data generated based on one set of sound signals for two channels selected out of sets of the selected sound signals for four channels and second sound data generated based on an other set of sound signals for two channels selected out of the sets of the selected sound signals for four channels, on two sound tracks included in one video file, respectively, in accordance with the first format.

The imaging apparatus according to the present disclosure offers improved user-friendliness in sound edition in a video making process.

BRIEF DESCRIPTION OF DRAWINGS

FIG. 6 is a diagram for describing an example of a method of recording sound signals according to the present exemplary embodiment.

DESCRIPTION OF EMBODIMENT

Hereinafter, exemplary embodiments will be described in detail with reference to the drawings as appropriate. However, detailed descriptions more than necessary may be omitted. For example, a detailed description of known matters and a duplicate description of substantially identical configurations may be skipped. This is to avoid the following description from being unnecessarily redundant and thus to help those skilled in the art to easily understand the description.

Here, the inventor provides the accompanying drawings and the following description such that those skilled in the art can sufficiently understand the present disclosure, and therefore, they do not intend to restrict the subject matters of claims.

First Exemplary Embodiment

With reference to the accompanying drawings, a description will be given below of a configuration and operation of a digital camera, which is one exemplary embodiment of an imaging apparatus according to the present disclosure. The digital camera described below is capable of shooting videos. Shooting a video creates a video file that includes image data indicating moving images and sound data (i.e., data of sounds) recorded in synchronization with recording of moving images.

[1-1. Configuration]

Figure 1:
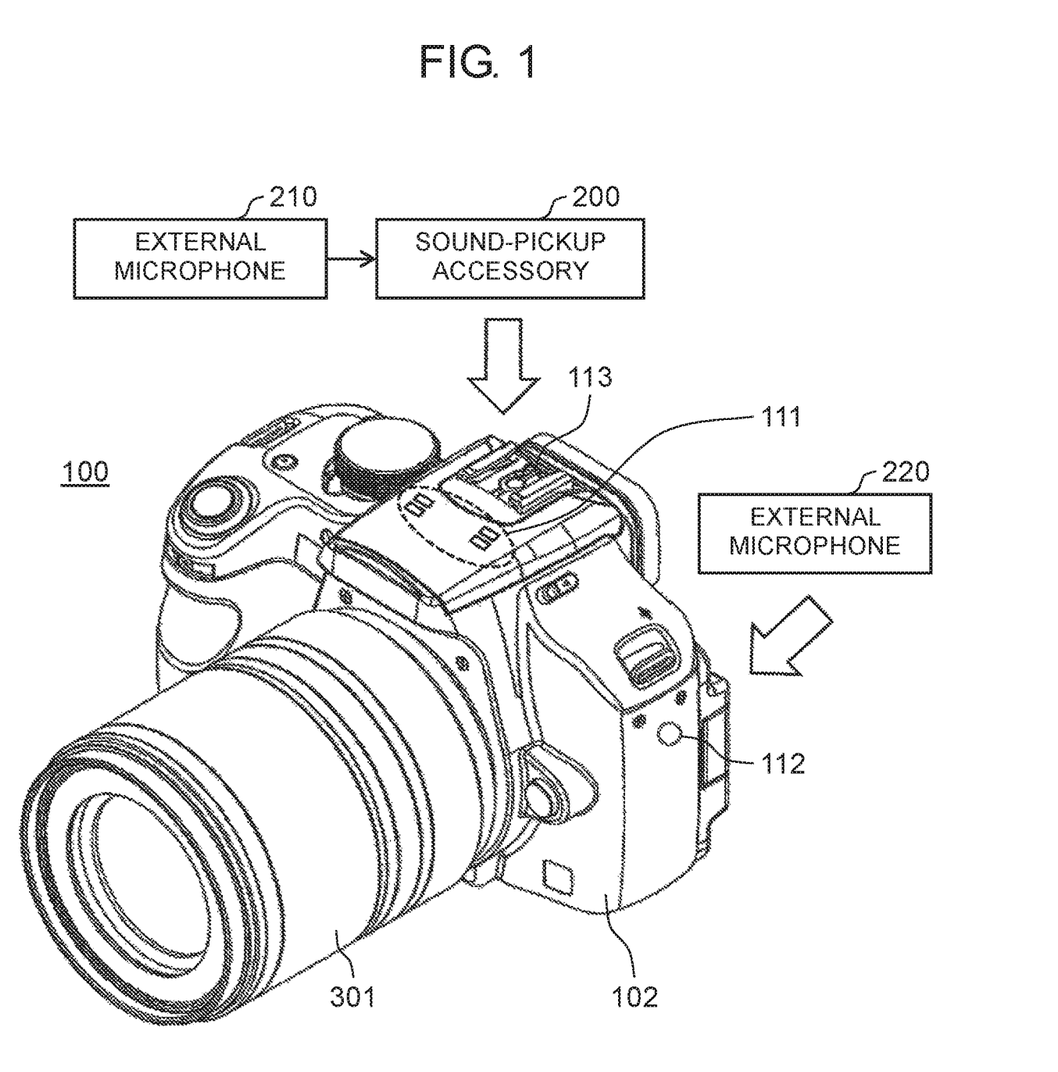
FIG. 1 is a perspective view of a digital camera according to an exemplary embodiment of the present disclosure.

FIG. 1 is a perspective view of a digital camera that is one exemplary embodiment of an imaging apparatus according to the present disclosure. Digital camera 100 includes camera body 102 and interchangeable lens 301 attached to camera body 102. Digital camera 100 can shoot videos. Upon shooting a video, digital camera 100 can record moving images as well as sounds at the same time. Digital camera 100 includes three sound input systems. Specifically, digital camera 100 includes built-in microphone (example of a first microphone) 111, external input terminal (example of a second input terminal) 112, and hot shoe (example of a first input terminal) 113, as sound input systems.

Built-in microphone 111 is a sound input unit incorporated into camera body 102. External input terminal 112 receives incoming sound signals from the outside. Hot shoe 113 functions as a connection terminal that receives incoming sound signals from the outside. To external input terminal 112, external microphone (example of a third microphone) 220 is connected. When hot shoe 113 functions as a sound input system, sound-pickup accessory (sound-recording accessory) 200 (e.g., a microphone adaptor) is connected to hot shoe 113. To sound-pickup accessory 200, external microphone (example of a second microphone) 210 is connected.

Figure 2:
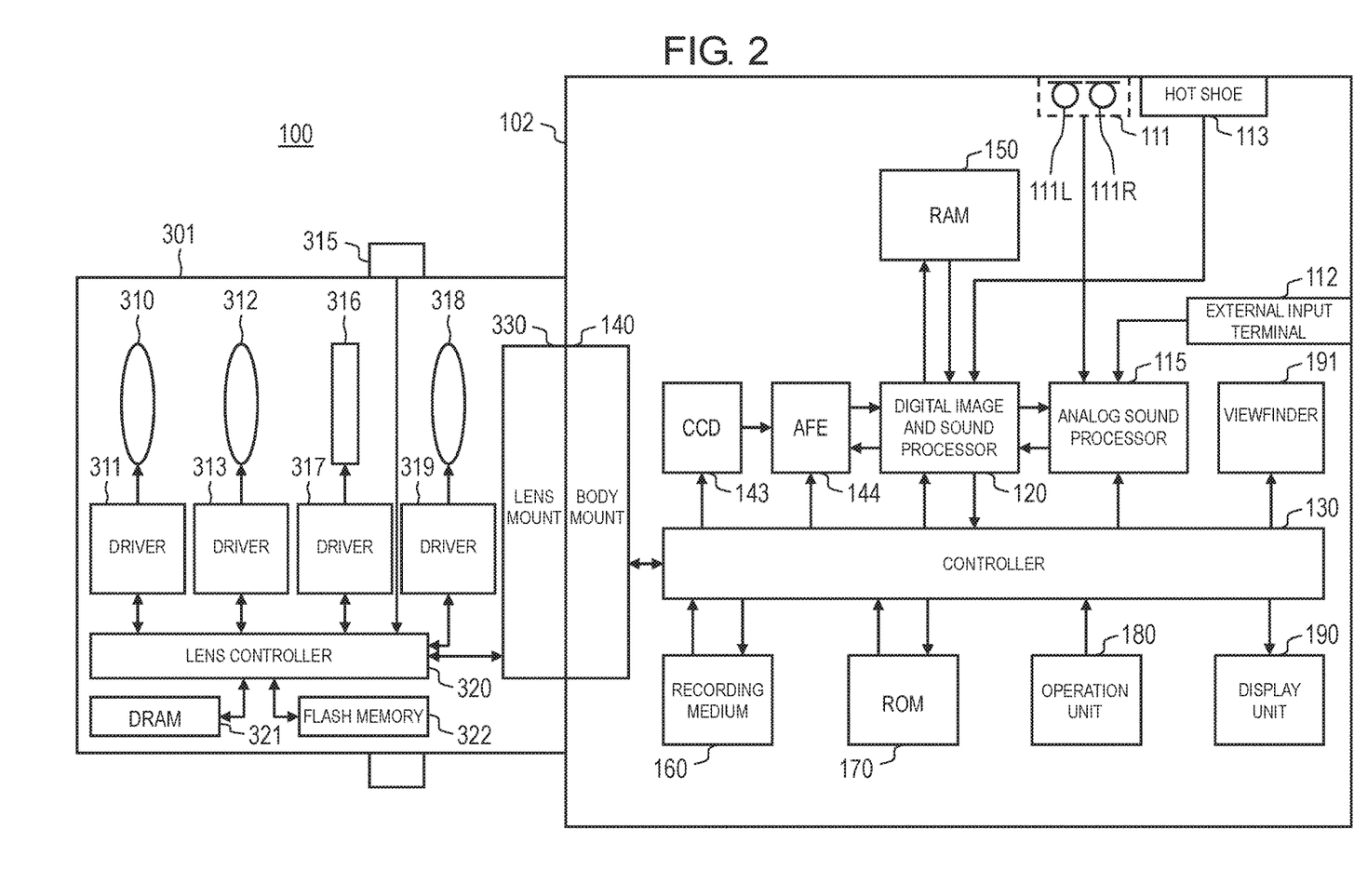
FIG. 2 is a block diagram showing an internal configuration of the digital camera according to the present exemplary embodiment.

FIG. 2 is a block diagram of an internal configuration of digital camera 100. Digital camera 100 captures an image of a subject, generates an image file, and records the image file on a recording medium. For example, when shooting a video, digital camera 100 generates a video file in which image data and sound data are multiplexed, and records the video file in the recording medium. Individual constituent elements of digital camera 100 will hereinafter be described in detail.

[1-1-1. Interchangeable Lens]

As shown in FIG. 2, interchangeable lens 301 includes an optical system including focus lens 310, correcting lens 318, and zoom lens 312. Interchangeable lens 301 further includes lens controller 320, lens mount 330, focus lens driver 311, zoom lens driver 313, diaphragm 316, diaphragm driver 317, operation ring 315, optical image stabilizer (OIS) driver 319, dynamic random access memory (DRAM) 321, and flash memory 322.

Lens controller 320 controls entire operation of interchangeable lens 301. Lens controller 320 can control focus lens driver 311, OIS driver 319, and diaphragm driver 317, respectively, so as to drive focus lens 310, correcting lens 318, and diaphragm 316. Further, lens controller 320 receives operation of operation ring 315 performed by a user, and can control zoom lens driver 313 so as to drive zoom lens 312 in accordance with the operation.

OIS driver 319 is provided with, for example, a drive mechanism that includes a magnet and a planar coil. OIS driver 319 controls the drive mechanism based on a detection signal from a gyro sensor (not illustrated) that detects unsteadiness of interchangeable lens 301 and shifts correcting lens 318 in a plane vertical to an optical axis of the optical system in accordance with the unsteadiness of interchangeable lens 301. As a result, an influence of unsteadiness caused by camera shake in a captured image is reduced.

Lens controller 320 is connected to DRAM 321 or to flash memory 322, and writes or reads information in or from these memories as necessary. In addition, lens controller 320 communicates with controller 130 in camera body 102 via lens mount 330. Lens controller 320 may be configured with a hard-wired electronic circuit or with a microcomputer using a program, for example.

Lens mount 330 is connected to body mount 140 of camera body 102 so that interchangeable lens 301 is mechanically and electrically connected to camera body 102. When interchangeable lens 301 is connected to camera body 102, lens controller 320 and controller 130 can communicate each other. Body mount 140 can transmit a signal received from lens controller 320 via lens mount 330, to controller 130 in camera body 102.

[1-1-2. Camera Body]

Camera body 102 includes charge coupled device (CCD), image sensor 143, and analog front end (AFE) 144.

CCD image sensor 143 captures a subject image formed through interchangeable lens 301 and generates image information. As the image sensor, another kind of image sensor (for example, complementary metal oxide semiconductor (CMOS) image sensor) may be used.

AFE 144 performs noise suppression on image information read from CCD image sensor 143, through correlative double sampling of the image information. Furthermore, AFE 144 amplifies the image information, using an analog gain controller, to increase an amplitude of the image information to an input range of an analog/digital (AD) converter. In addition, AFE 144 performs analog-to-digital conversion of the image information, using the AD converter.

Camera body 102 further includes built-in microphone 111 (example of the sound input unit) and external input terminal 112, as elements for inputting sounds.

Built-in microphone 111 includes two microphones 111L, 111R. Microphones 111L, 111R, separately collect a main sound from the left side and a main sound from the right side, respectively, and generates sound signals for two channels. A main sound is a sound that a user intends to record. Hereinafter, two channels will be referred to as 2 ch. According to the present exemplary embodiment, microphone 111L collects a main sound from the left side and generates a sound signal for one channel (for example, L ch). Microphone 111R collects a main sound from the right side and generates a sound signal for one channel for example, R ch). Microphones 111L, 111R each transform a sound into an electric signal. Electric signals output from microphones 111L, 111R according to the present exemplary embodiment thus represent analog sound signals. The analog sound signals from microphones 111L, 111R are each input to analog sound processor 115.

External input terminal 112 is a terminal for inputting sound signals for 2 ch from the outside, and is provided as, for example, a jack with an opening of 3.5 mm in diameter. To external input terminal 112, for example, external microphone 220 is connected.

Hot shoe 113 is a device for connecting various accessories to camera body 102. Such accessories include, for example, an electric flash and a sound-pickup accessory (for example, a microphone adaptor). The sound-pickup accessory receives incoming sound signals from a sound-collector (for example, microphone 210) connected to the sound-pickup accessory, and sends the sound signals to the interior of camera body 102. The sound-pickup accessory has a function of amplifying incoming analog sound signals from the sound-collector and converting the analog sound signals into digital signals or cutting a given low-frequency range for noise elimination. The sound-pickup accessory outputs digital sound signals for 2 ch. A sound recording function of digital camera 100 in a case where the sound-pickup accessory is connected to hot shoe 113 will be described in a description that will be made later.

Analog sound processor 115 amplifies incoming analog sound signals from built-in microphone 111 or from external input terminal 112 and converts the analog sound signals into digital sound signals. Analog sound processor 115 then outputs the converted digital sound signals to digital image and sound processor 120.

Figure 3:
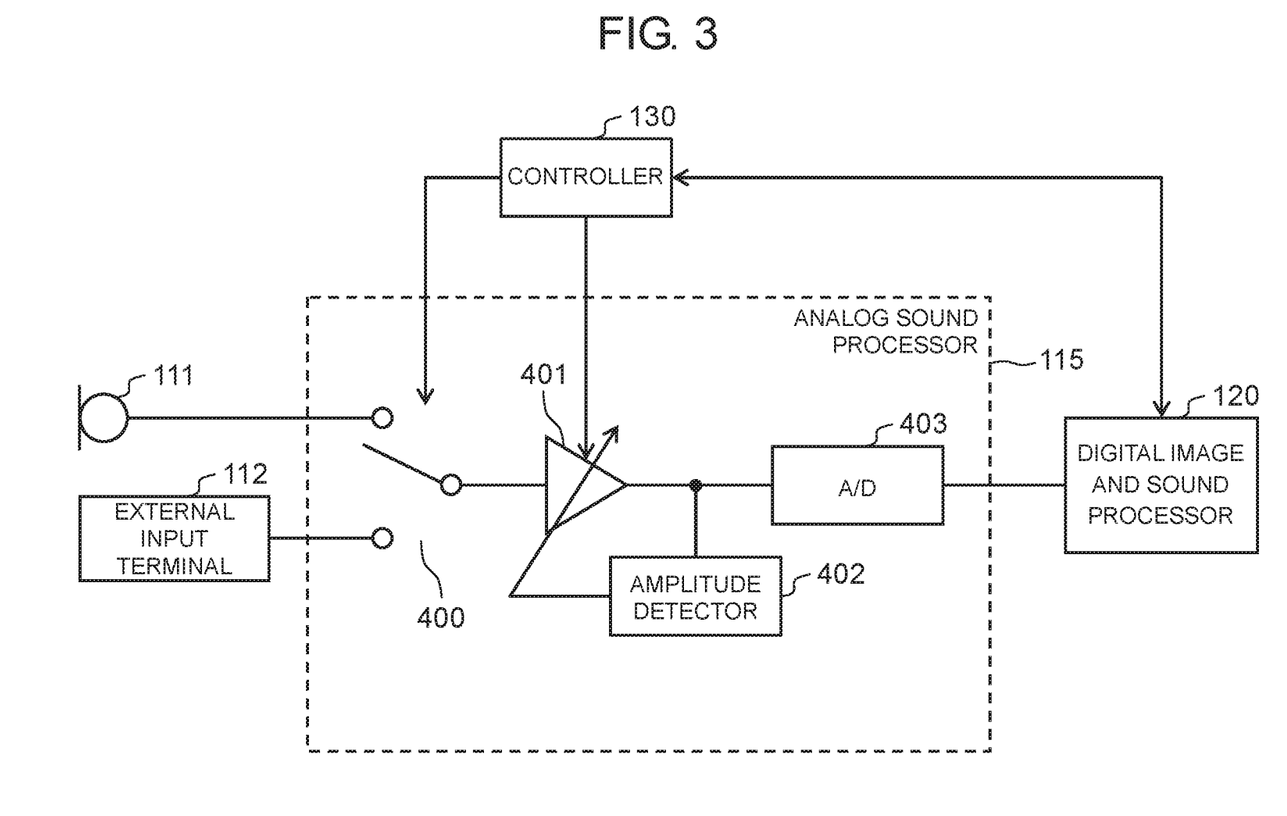
FIG. 3 depicts a configuration of an analog sound processor in the digital camera according to the present exemplary embodiment.

FIG. 3 is a block diagram of a configuration of analog sound processor 115. Analog sound processor 115 includes input changeover switch 400, amplifier 401, amplitude detector 402, and A/D converter 403.

In analog sound processor 115, input changeover switch 400 follows control by controller 130 and switches an input destination for sound signals between built-in microphone 111 and external input terminal 112. Amplifier 401 amplifies analog sound signals at a given gain, the sound signals being input to amplifier 401 via input changeover switch 400, and outputs the amplified analog sound signals to A/D converter 403. A/D converter 403 receives the analog sound signals amplified by amplifier 401, performs A/D conversion on the sound signals, and outputs the sound signals converted into digital signals to digital image and sound processor 120. Amplitude detector 402 receives the sound signals amplified by amplifier 401 and feedback-controls a gain of amplifier 401 such that an amplitude of the analog sound signals does not exceed an input acceptable level of A/D converter 403. Analog sound processor 115 is configured with an electronic circuit including an analog circuit. Analog sound processor 115 may be configured with one or a plurality of semiconductor integrated circuit(s).

Digital image and sound processor (example of a control unit) 120 subjects image information output from AFE 144, to various processes. Digital image and sound processor 120 subjects also at least either incoming sound signals from analog sound processor 115 or incoming sound signals from hot shoe 113, to various processes. For example, in accordance with an instruction from controller 130, digital image and sound processor 120 executes gamma correction, white balance correction, defect correction, encoding process, and the like on the image information. Likewise, in accordance with an instruction from controller 130, digital image and sound processor 120 executes various processes on the sound signal. Digital image and sound processor 120 may be achieved by a hard-wired electronic circuit or a microcomputer that executes a program. A circuit, that achieves digital image and sound processor 120 may be integrated into one or a plurality of semiconductor integrated circuit(s). Digital image and sound processor 120 may be configured with, for example, a central processing unit (CPU), a field-programmable gate array (FPGA), an application specific integrated circuit (ASK), or a digital signal processor (DSP).

Display unit 190 is disposed on a rear surface of digital camera 100. Display unit 190 may be configured with a liquid crystal display or an organic electro luminescence (EL) display. Display unit 190 displays an image based on image information processed by digital image and sound processor 120. Display unit 190 includes a touch panel. The touch panel receives a user operation on a display screen.

Viewfinder 191 is disposed on an upper portion of the rear surface of digital camera 100. Viewfinder 191 displays an image based on image information processed by digital image and sound processor 120, in the same manner as display unit 190 does. Both of display unit 190 and viewfinder 191 may display the images based on the image information at the same time, or only one of display unit 190 and viewfinder 191 may display the image.

Controller 130 (example of the control unit) integrally controls entire operation of digital camera 100. Controller 130 may be achieved by a hard-wired electronic circuit or a microcomputer that executes a program, for example. Further, controller 130 may be achieved as one semiconductor chip integrally with digital image and sound processor 120, for example. For example, controller 130 alone or integrated with digital image and sound processor 120 may be configured with a CPU, FPGA, ASIC, DSP, or the like.

Read only memory (ROM) 170 stores programs related to automatic focus control (AF control), automatic exposure control (AE control), light emission control of an electronic flash, and the like to be executed by controller 130. ROM 170 stores also a program with which controller 130 integrally controls the entire operation of digital camera 100. ROM 170 stores various conditions and settings related to digital camera 100. ROM 170 does not need to be outside controller 130. In other words, ROM 170 does not need to be an element separated from controller 130. ROM 170 may be incorporated into controller 130. According to the present exemplary embodiment, ROM 170 is a flash ROM.

Random access memory (RAM) 150 functions as a working memory for digital image and sound processor 120 and controller 130. RAM 150 may be implemented using a synchronous dynamic random access memory (SDRAM) or a flash memory, for example. RAM 150 functions also as an internal memory in which image information, sound signals, and the like are recorded.

Recording medium 160 is a memory device having a nonvolatile storage cell such as a flash memory therein. Recording medium 160 can be removed and attached from and to digital camera 100. Recording medium 160 is, for example, a memory card such as a secure digital (SD) card. In accordance with control of controller 130, recording medium 160 records image data and sound data to be processed by digital image and sound processor 120, as a video file.

Operation unit 180 is a general name of at least one of operation interfaces, such as an operation button, an operation dial, a lever, and a touch panel, that are disposed on an exterior of digital camera 100. Operation unit 180 receives operation performed by the user. According to the present exemplary embodiment, for example, operation unit 180 includes a release button, a power switch, and a mode dial that are provided on an upper surface of digital camera 100. Operation unit 180 further includes a center button and a cross button that are provided on the rear surface of digital camera 100. Further, operation unit 180 includes also the touch panel of display unit 190. When receiving operation performed by the user, operation unit 180 sends signals instructing various operations to controller 130.

[1-2. Operation]

When shooting a video, digital camera 100 according to the present exemplary embodiment can record sound data for 2 ch or 4 ch in synchronization with recording of image data. Sound recording operation performed by digital camera 100 at video shooting will hereinafter be described.

Figure 4:
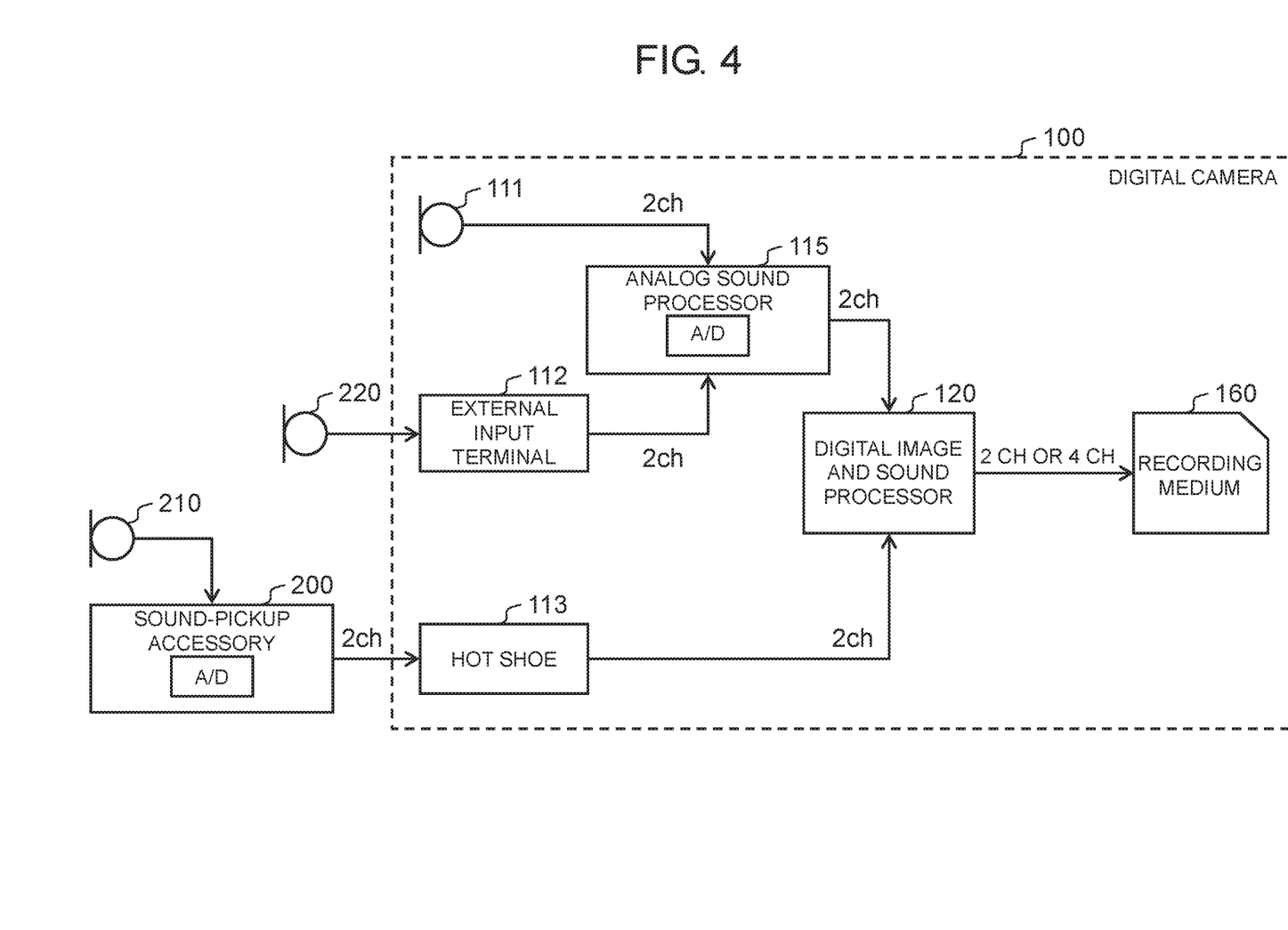
FIG. 4 depicts constituent elements related to a sound recording process according to the present exemplary embodiment.

FIG. 4 is a diagram for describing sound recording operation performed by digital camera 100 for recording sound data for 2 ch or 4 ch. Digital camera 100 includes built-in microphone 111, external input terminal 112, and hot shoe 113, as the sound input systems. To external input terminal 112, external microphone 220 can be connected. To hot shoe 113, sound-pickup accessory 200 that outputs digital sound signals for 2 ch can be connected. Sound-pickup accessory 200 has a built-in A/D converter. When external microphone 210 is connected to sound-pickup accessory 200, sound-pickup accessory 200 coverts incoming analog sound signals from external microphone 210 into digital sound signals through the built-in A/D converter and outputs the digital sound signals.

Analog sound processor 115 amplifies incoming analog sound signals from built-in microphone 111 or those from external input terminal 112 (example of specific sound signals according to the present disclosure), converts the amplified analog sound signals into digital sound signals, and then outputs the digital sound signals as sound signals for 2 ch. Specifically, when external microphone 220 is not connected to external input terminal 112, analog sound processor 115 amplifies incoming analog sound signals from built-in microphone 111, converts the amplified analog sound signals into digital sound signals, and outputs the digital sound signals as sound signals for 2 ch. When external microphone 220 is connected to external input terminal 112, on the other hand, analog sound processor 115 selects either sound signals from built-in microphone 111 or sound signals from external input terminal 112 according to setting made by the user, and receives the selected sound signals as input signals. Analog sound processor 115 then amplifies the input sound signals, converts the amplified sound signals into digital sound signals, and then outputs the digital sound signals as sound signals for 2 ch.

Digital image and sound processor 120 receives incoming digital sound signals for 2 ch from analog sound processor 115 or those from hot shoe 113. In another case, digital image and sound processor 120 receives both incoming digital sound signals for 2 ch from analog sound processor 115 and those from hot shoe 113, thus receiving incoming digital sound signals for 4 ch in total. In accordance with setting made by the user, digital image and sound processor 120 selects either digital sound signals for 2 ch or digital sound signals for 4 ch, and outputs the selected digital sound signals. Specifically, when sound-pickup accessory 200 is connected to hot shoe 113 and the user has made setting for recording sounds for 2 ch, digital image and sound processor 120 subjects the received incoming sound signals from hot shoe 113 to a given process and then records resulting sound data on recording medium 160, as digital sound signals for 2 ch. When sound-pickup accessory 200 is connected to hot shoe 113 and the user has made setting for recording sounds for 4 ch, digital image and sound processor 120 subjects both the received incoming sound signals from analog sound processor 115 and those from hot shoe 113 to a given process and then records resulting sound data on recording medium 160, as digital sound signals for 4 ch. At this time, analog sound processor 115 selects either incoming sound signals from built-in microphone 111 or those from external input terminal 112 in accordance with setting made by the user, converts the selected sound signals into digital sound signals, and then outputs the digital sound signals to digital image and sound processor 120.

When sound-pickup accessory 200 is connected to hot shoe 113, the user is allowed to make setting in advance for recording sound signals for 2 ch or for recording sound signals for 4 ch. When sound-pickup accessory 200 is connected to hot shoe 113 and sound signals for 4 ch are to be recorded, digital camera 100 according to the present exemplary embodiment performs sound recording using either a combination of sound signals from built-in microphone 111 and sound signals from hot shoe 113 or a combination of sound signals from external input terminal 112 and sound signals from hot shoe 113. When sound-pickup accessory 200 is connected to hot shoe 113 and sound signals for 4 ch are to be recorded, therefore, the user is allowed to make setting in advance to determine which of the above combinations as input systems is to be used to perform sound recording.

Figure 5:
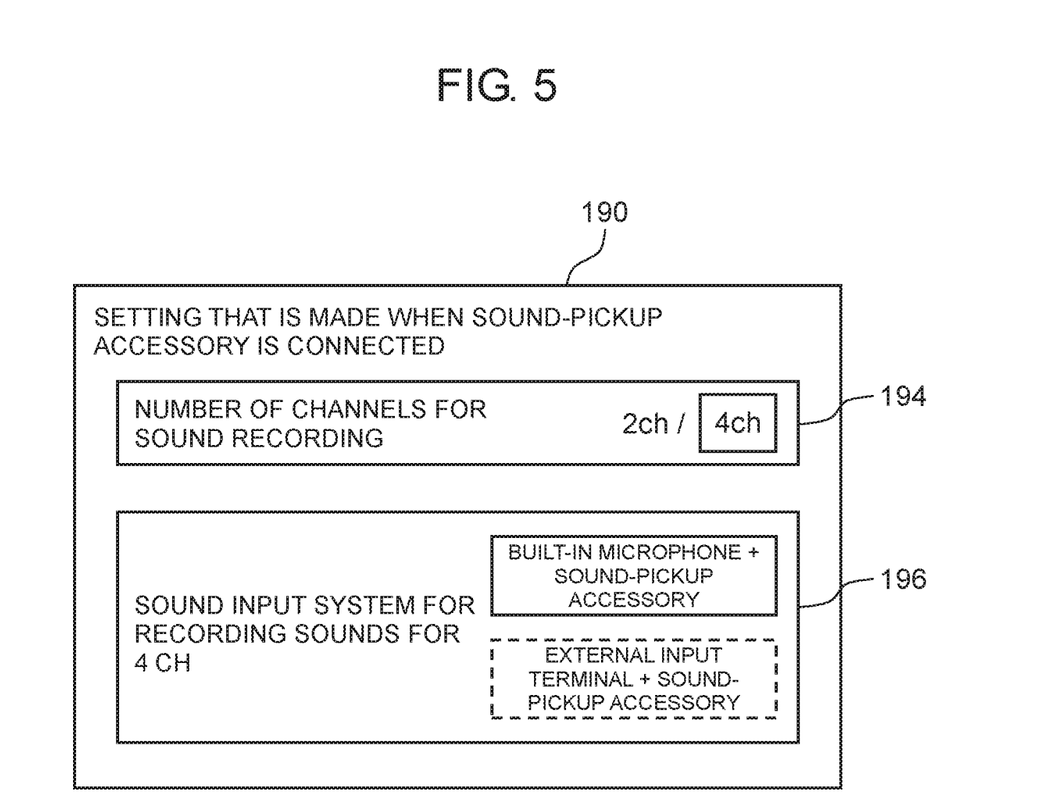
FIG. 5 depicts an example of a screen for making settings on sound recording when a sound-pickup accessory is connected to a hot shoe, according to the present exemplary embodiment.

FIG. 5 depicts an example of a setting screen for setting a number of channels for sound signals to be recorded and setting an input system for the sound signals. The setting screen is displayed on display unit 190. As shown in FIG. 5, when sound-pickup accessory 200 is connected to hot shoe 113, setting item 194 receives a selection that determines the number of channels for sound signals to be recorded to be 2 or 4. FIG. 5 shows a case where setting is made to record sound signals for 4 ch when sound-pickup accessory 200 is connected to hot shoe 113. When sound-pickup accessory 200 is connected to hot shoe 113 and sound signals for 4 ch are to be recorded, setting item 196 receives a selection of an input system for the sound signals. FIG. 5 shows a case where sound signals from built-in microphone 111 and sound signals from hot shoe 113 are determined to be the sound signals for 4 ch to be recorded. Details of settings made on this setting screen are stored in a memory (not illustrated) in camera body 102, as setting information.

Figure 6:
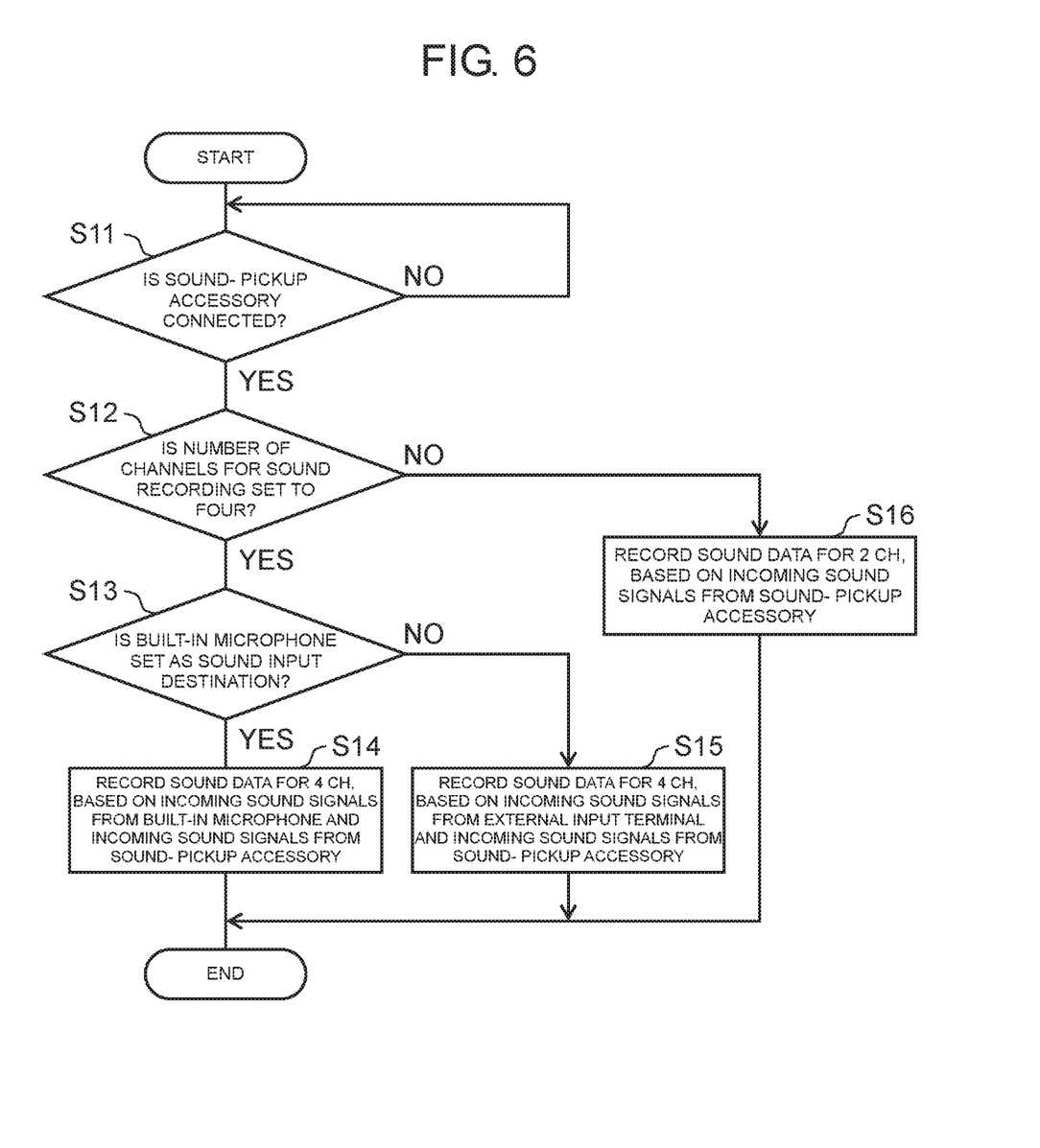
FIG. 6 is a flowchart of a sound recording process that is carried out when the sound-pickup accessory is connected to the hot shoe in the digital camera according to the present exemplary embodiment.

FIG. 6 is a flowchart of a sound recording process that is carried out when sound-pickup accessory 200 is connected to hot shoe 113 when digital camera 100 shoots a video.

When sound-pickup accessory 200 is connected to hot shoe 113 (YES at S11), controller 130 refers to setting information to check the number of channels for sound recording that is carried out when sound-pickup accessory 200 is connected to hot shoe 113 (S12). When setting is made to record sound signals for 2 ch when sound-pickup accessory 200 is connected to hot shoe 113 (NO at S12), controller 130 controls digital image and sound processor 120 so that it records sound data for 2 ch in recording medium 160, based on incoming sound signals from sound-pickup accessory 200 (S16).

When setting is made to record sound signals for 4 ch when sound-pickup accessory 200 is connected to hot shoe 113 (YES at S12), controller 130 refers to the setting information to determine whether a combination of built-in microphone 111 and sound-pickup accessory 200 is set as an input system for the sound signals (S13).

When sound signals for 4 ch are to be recorded and a combination of built-in microphone 111 and sound-pickup accessory 200 is set as the input system for the sound signals (YES at S13) controller 130 controls digital image and sound processor 120 so that it generates sound data for 4 ch, based on sound signals from built-in microphone 111 and sound signals from sound-pickup accessory 200 (i.e., sound signals from hot shoe 113), and records the generated sound data in recording medium 160 (S14). In this case, the sound data for 4 ch is generated based on sound signals for 2 ch from built-in microphone 111 and sound signals for 2 ch from sound-pickup accessory 200 connected to hot shoe 113.

When the combination of built-in microphone 111 and sound-pickup accessory 200 is not set as the sound input system for recording sound signals for 4 ch (NO at S13), that is, a combination of external input terminal 112 and sound-pickup accessory 200 is set instead, controller 130 controls digital image and sound processor 120 so that it generates sound data for 4 ch, based on sound signals from external input terminal 112 and sound signals from hot shoe 113, and records the generated sound data in recording medium 160 (S15). In this case, the sound data for 4 ch is generated based on sound signals for 2 ch from the external microphone connected to external input terminal 112 and sound signals for 2 ch from sound-pickup accessory 200 connected to hot shoe 113.

Sound data generated in the above manner is recorded in a video file, together with image data generated from image signals that are recorded in synchronization with recording of sound signals. Under a condition in which sound signals and image signals are synchronized with each other, it is necessary that when a video file is replayed, a sound to be reproduced in synchronization with reproduction of an image not be reproduced before reproduction of the image.

As described above, according to digital camera 100 of the present exemplary embodiment, when sound-pickup accessory 200 is connected to hot shoe 113 at video shooting, sound signals for 4 ch can be recorded according to the setting information set by the user. A video is edited using a video file including data of sound signals (i.e., sound data) that is recorded in the above manner. In this video editing, sound signals for 4 ch can be used. This improves a degree of freedom in editing sounds. In addition, sound signals synchronized with image signals can be used. This eliminates a need of synchronizing images and sounds in video editing work, thus reducing burden of editing work.

Figure 7:
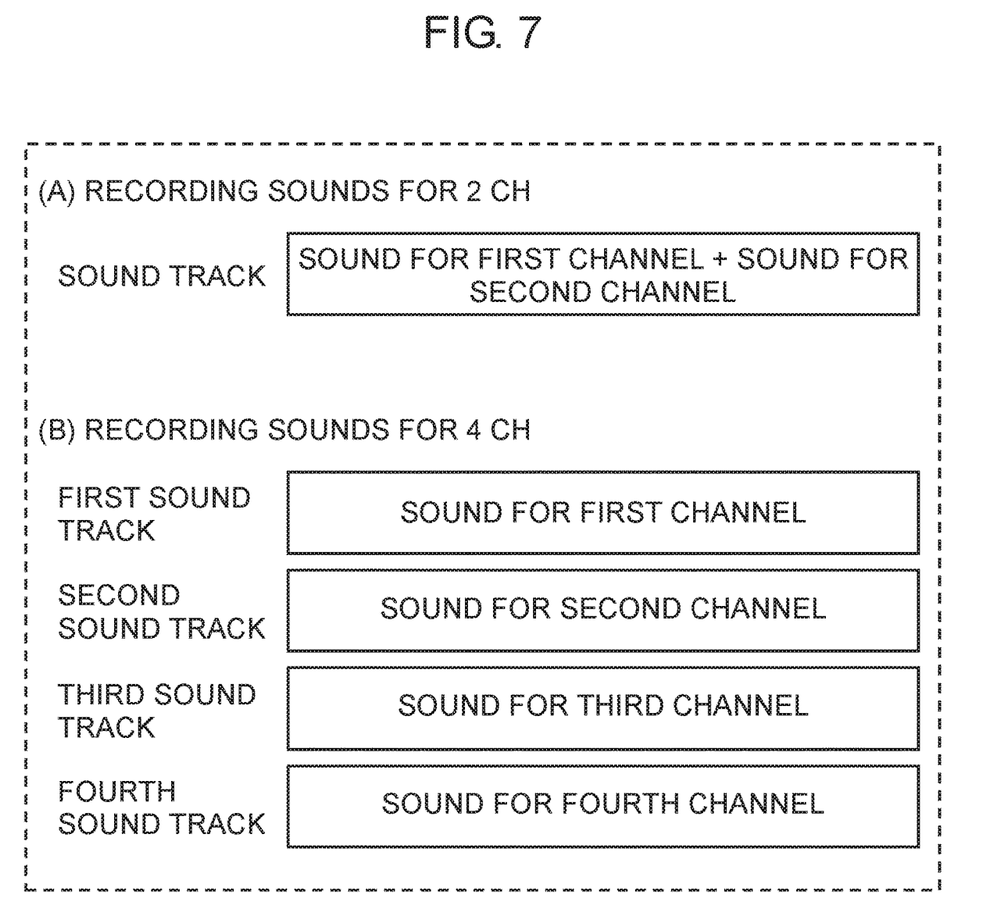
FIG. 7 is a diagram for describing a format adopted at recording of 2 ch sounds and a format adopted at recording of 4 ch sounds in the digital camera according to the present exemplary embodiment.

FIG. 7 is a diagram for describing a method of recording sound signals for 2 ch or 4 ch that is carried out by digital camera 100 according to the present exemplary embodiment. (A) of FIG. 7 is a diagram for describing a first format adopted at recording of sound signals for 2 ch. (B) of FIG. 7 is a diagram for describing a second format adopted at recording of sound signals for 4 ch.

In a video file generated by video shooting by digital camera 100, one image track and at least one sound track are multiplexed. When sound signals for 2 ch are to be recorded, controller 130 controls digital image and sound processor 120 so that it generates sound data based on a sound signal for a first channel (L ch) and a sound signal for a second channel (R ch), that is, two sound signals, as shown in (A) of FIG. 7. Further, controller 130 prepares one sound track according to the first format. Controller 130 then controls digital image and sound processor 120 so that it records sound data generated by synthesizing the sound signal for the first channel (L ch) and the sound signal for the second channel (H ch), on the one sound track. Subsequently, controller 130 controls digital image and sound processor 120 so that it records the sound data in the video file, as multiplexed sound data.

When sound signals for 4 ch are to be recorded, on the other hand, controller 130 prepares four sound tracks according to the second format, as shown (B) of FIG. 7. Controller 130 then controls digital image and sound processor 120 so that it records a sound signal for one channel in each of the sound tracks. As a result, sound signals for 4 ch, i.e., sound signals for first to fourth channels are recorded collectively. Such a recording method is implemented as a novel recording method.

Generally, a TV set or recorder is configured to replay a video file including recorded sound data in accordance with the first format (which is the format for recording sound signals for 2 ch on one sound track) as shown in (A) of FIG. 7. A video file including sound data for 2 ch recorded by digital camera 100 according to the present exemplary embodiment is, therefore, replayed by ordinary TV sets or recorders.

Meanwhile, according to the present exemplary embodiment, the second format is applied to recording of sound signals for 4 ch. In the second format according to the present exemplary embodiment, sound data for 1 ch is recorded on each of four tracks. Ordinary TV sets or recorders do not support this second format. A video file including sound data for 4 ch recorded in the second format is, therefore, not replayed by ordinary TV sets or recorders. This prevents the occurrence of such a case where an ordinary TV set or recorder erroneously replays a video file including sound data for 4 ch recorded by digital camera 100 and consequently outputs a sound that the user conceives as strange one.

[1-3. Effects or the Like]

Digital camera 100 (example of the imaging apparatus) according to the present exemplary embodiment includes built-in microphone 111 (example of the first microphone) that receives incoming sounds to output first sound signals, hot shoe 113 (example of the first input terminal) configured to receive incoming second sound signals from external microphone 210 (example of the second microphone), external input terminal 112 (example of the second input terminal) configured to receive incoming third sound signals from external microphone 220 (example of the third microphone), operation unit 180 (example of the setting unit) that receives setting of the number of channels for sound signals to be recorded, controller 130 that based on setting made on the operation unit 180, controls sound signal recording, and digital image and sound processor 120 (example of the control unit).

Controller 130 and digital image and sound processor 120 are configured to operate such that when the number of channels is set to two, controller 130 and digital image and sound processor 120 select one set of sound signals out of sets of the first sound signals, the second sound signals, and the third sound signals. Further, controller 130 and digital image and sound processor 120 are configured to operate such that according to the first format, controller 130 and digital image and sound processor 120 generate sound data, based on one set of sound signals selected out of sets of the first sound signals, the second sound signals, and the third sound signals, and record the generated sound data on one track prepared as a sound track included in a video file.

Controller 130 and digital image and sound processor 120 are configured to operate such that when the number of channels is set to four, controller 130 and digital image and sound processor 120 perform sound signal processing according to the second format different from the first format. According to the second format, controller 130 and digital image and sound processor 120 generate sound data for four channels based on specific sound signals selected as either the first sound signals or third sound signals and on the second sound signals. Further, controller 130 and digital image and sound processor 120 are configured to record the generated sound data for four channels respectively on four tracks prepared as sound tracks included in the video file so that each piece of data is allocated to each of the four tracks.

Video editing using a video file including sound signals recorded by digital camera 100 according to the present exemplary embodiment allows use of sound signals for 4 ch. This improves a degree of freedom in sound editing. Such video editing allows use of sound signals synchronized with image signals, thus eliminating a need of synchronization between images and sounds in video editing work. This reduces burden of editing work. Furthermore, when sound signals for 4 ch are recorded, sound data is recorded in the second format. This prevents a case where electronic equipment not supporting the second format erroneously replays a video file.

Specifically, when sound signals for 4 ch are recorded according to the first format, two pieces of sound data for 2 ch are recorded on two sound tracks, respectively. In this case, a generated video file may possibly be replayed by a TV set or a recorder or the like that does not support the second format but supports the first format. Even if the video file is replayed, however, it is possible that the sound signals for 4 ch is not reproduced properly. In other words, the user may view the video file, in sonic cases, as the user does not know correctly whether sound data is for 2 ch or 4 ch. This results in lower user-friendliness. According to the present exemplary embodiment, electronic equipment not supporting the second format is prevented from erroneously replaying a video file. This allows the user to notice that a video file not replayed is a video file including sounds for 4 ch. As a result, user-friendliness is improved.

Digital camera 100 may further include A/D converter 115 (example of an A/D converter) that based on setting made on operation unit 180, selects either the first sound signals or the third sound signals and subjects the selected sound signals to A/D conversion. In this configuration, sound signals for 4 ch input by two external microphones 210, 220 can be recorded.

Other Exemplary Embodiments

The first exemplary embodiment has been described above as an example of the technique disclosed. In the present application. However, the technique in the present disclosure is not limited to this, and can also be applied to exemplary embodiments having undergone changes, replacements, additions, omissions, and the like as appropriate. In addition, new exemplary embodiments can be made by combining constituent elements described in the first exemplary embodiment.

According to the above exemplary embodiment, when sound signals for 4 ch are to be recorded, sound data is generated according to the second format and is recorded in a video file. However, when sound signals for 4 ch are to be recorded, formats for generating and recording sound data are not limited to the second format.

Thus, when the number of channels for sound signals to be recorded is set to four, controller 130 and digital image and sound processor 120 (example of the control unit) must be configured not to record first sound data generated based on specific sound signals selected as either the first sound signals or the third sound signals and second sound data generated based on the second sound signals, respectively, on two tracks prepared as sound tracks included in a video file.

The specific sound signals are, for example, sound signals output from either built-in microphone 111 or external microphone 220. The user may be allowed to determine which of sound signals from built-in microphone 111 and sound signals from external microphone 220 are to be used. The specific sound signals have 2 ch. The second sound signals are, for example, sound signals output from external microphone 210. The second sound signals also have 2 ch.

This configuration prevents a case where a plurality of sound tracks each having sound data for 2 ch recorded thereon are associated with one image track and are included in a video file. The configuration, therefore, prevents electronic equipment not supporting recording methods adopted by digital camera 100 but supporting the first format from erroneously replaying a video file.

The recording methods adopted by digital camera 100 include the following recording methods (A) and (B), in addition to the recording method according to the exemplary embodiment. For example, at least any one recording method selected from the recording method according to the exemplary embodiment and the following recording methods (A) and (B) may be applied to digital camera 100.

According to the recording method (A), when the number of channels for sound signals to be recorded is set to four, controller 130 and digital image and sound processor 120 (example of the control unit), according to the first format, generate first sound data based on one set of sound signals selected out of a set of specific sound signals selected as either the first sound signals or the third sound signals and a set of the second sound signals, and record the first sound data on one track prepared as a sound track included in a video file.

Further, controller 130 and digital image and sound processor 120 (example of the control unit), according to the third format different from the first format, generate second sound data based on the other set of sound signals selected out of the set of specific sound signals and the set of the second sound signals, and record the second sound data in a sound file.

Figure 8:
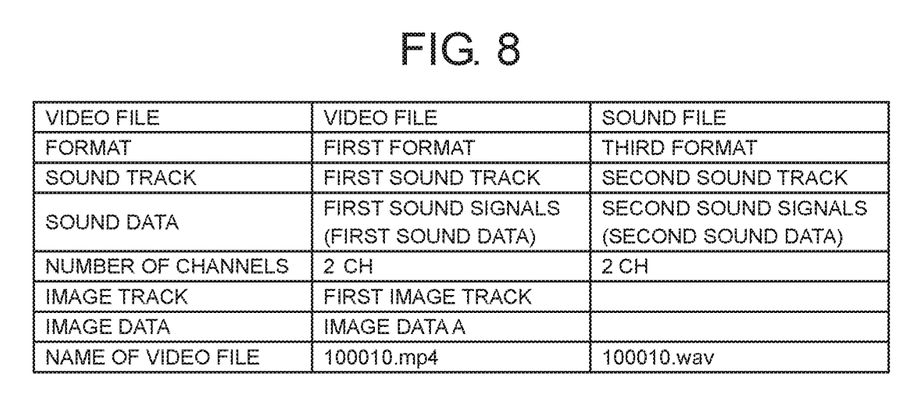

FIG. 8 is a diagram for describing an example of a method of recording sound signals for 4 ch. Controller 130 and digital image and sound processor 120 prepare two sound tracks (for example, a first sound track and a second sound track) and one image track (for example, a first image track). The first sound track and the first image track are included in one video file. The second sound track is included in a sound file.

According to the first format, controller 130 controls digital image and sound processor 120 so that it records, for example, sound data (first sound data) generated from the first sound signals for 2 ch (i.e., one set of sound signals selected as specific sound signals out of sets of the first sound signals and third sound signals) on the first sound track.

Controller 130 then controls digital image and sound processor 120 so that it records data of moving images (i.e., image data A) captured in synchronization with the sound data recorded on the first sound track, on the first image track.

In the above manner, controller 130 and digital image and sound processor 120 record the video file including the first sound track and the first image track, on the recording medium. Controller 130 can give the video file a file name, for example, "100010.mp4".

According to the third format, controller 130 controls digital image and sound processor 120 so that it records, for example, sound data (second sound data) generated from the second sound signals for 2 ch on the second sound track.

In the above manner, controller 130 and digital image and sound processor 120 record the sound file including the second sound track on the recording medium. Controller 130 can give the sound file a file name, for example, "100010.wav".

The user thus replays only the sound file and the video file including sounds for 2 ch. This prevents, therefore, a case where the user views a video as the user does not know correctly whether sounds in the video are for 2 ch or 4 ch. As a result, user-friendliness to the user is improved. Furthermore, it becomes easier for the user to notice whether a file to be replayed is a sound file or a video file including sounds for 2 ch.

Further, controller 130 can determine the file names, except extensions, of a video file and a sound file to be a common file name. As a result, the user can easily associate both files with each other. In other words, it becomes easier for the user to synchronize sound data included in the sound file with image data included in the video file. This allows, therefore, the user to edit sounds using sound signals for 4 ch. The above common file name is an exemplary case. A different file naming method may be adopted on the condition that the method allows the video file and the sound file to be associated with each other.

According to the recording method (B), when the number of channels for sound signals to be recorded is set to four, controller 130 and digital image and sound processor 120 (example of the control unit), according to the first format, generate third sound data based on one set of sound signals selected out of a set of specific sound signals selected as either the first sound signals or the third sound signals and a set of the second sound signals, and record the third sound data associated with first image data on a first video file.

Further, when the number of channels for sound signals to be recorded is set to four, controller 130 and digital image and sound processor 120 (example of the control unit), according to a fourth format different from the first format, generate fourth sound data based on the other set of sound signals selected out of the set of specific sound signals and the set of the second sound signals, and record the fourth sound data associated with second image data different from the first image data, in a second video file.

The specific sound signals are, for example, sound signals output from either built-in microphone 111 or external microphone 220. The user may be allowed to determine which of sound signals from built-in microphone 111 and sound signals from external microphone 220 are to be used. The specific sound signals have 2 ch. The second sound signals are, for example, sound signals output from external microphone 210. The second sound signals also have 2 ch.

Figure 9:
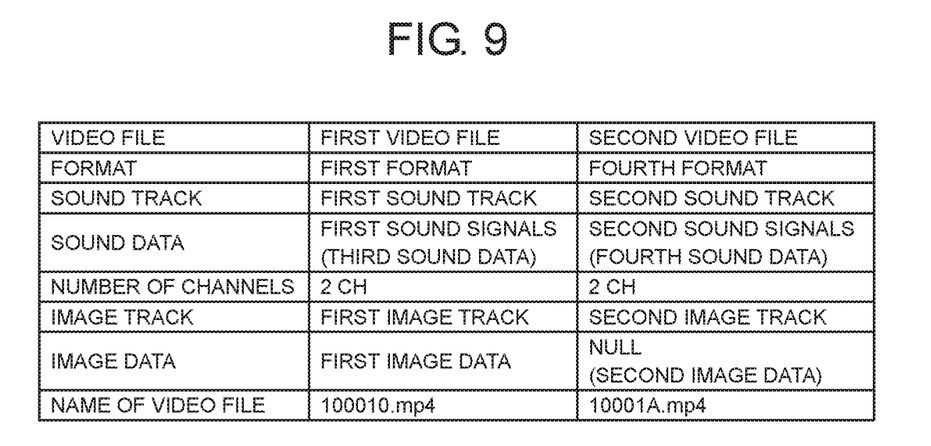
FIG. 9 is a diagram for describing another example of the method of recording sound signals according to the present exemplary embodiment.

FIG. 9 is a diagram for describing another example of the method of recording sound signals for 4 ch. Controller 130 and digital image and sound processor 120 prepare two sound tracks (for example, the first sound track and the second sound track) and two image tracks (for example, the first image track and a second image track). The first sound track and the first image track are included in the first video file. The second sound track and the second image track are included in the second video file.

According to the first format, controller 130 controls digital image and sound processor 120 so that it records, for example, sound data (third sound data) generated from the first sound signals for 2 ch (i.e., one set of sound signals selected as specific sound signals out of sets of the first sound signals and third sound signals) on the first sound track.

Controller 130 then controls digital image and sound processor 120 so that it records data of moving images (first image data) captured in synchronization with the sound data recorded on the first sound track, on the first image track. The first image data may be, for example, data of moving images that are captured when the first sound signals are recorded.

In the above manner, controller 130 and digital image and sound processor 120 record the first video file including the first sound track and the first image track, on the recording medium. Controller 130 can give the first video file a file name, for example, "100010.mp4".

According to the fourth format, controller 130 controls digital image and sound processor 120 so that it records, for example, sound data (fourth sound data) generated from the second sound signals for 2 ch on the second sound track.

Controller 130 then controls digital image and sound processor 120 so that it allocates "Null" image data to the second image track to record the "Null" image data on the second image track.

In the above manner, controller 130 and digital image and sound processor 120 record the second video file including the second sound track and the second image track, on the recording medium. Controller 130 can give the second video file a file name, for example, "10001.A.mp4".

The user thus replays only the video file including sounds for 2 ch or the video file including no images. This prevents, therefore, a case where the user views a video as the user does not know correctly whether sounds in the video are for 2 ch or 4 ch. As a result, user-friendliness to the user is improved.

Further, controller 130 can determine respective first-halves of the file names of the first and second video files to be a common file name. As a result, the user can easily associate both files with each other. In other words, sound data (fourth sound data) included in the second video file can be synchronized with image data (first image data) included in the first video file. This allows, therefore, the user to edit sounds using sound signals for 4 ch. The above common file name is an exemplary case. A different file naming method may be adopted on the condition that the method allows the first video file and the second video file to be associated with each other. Furthermore, it becomes easier for the user to identify a file as a video file including images or a file including no images by referring to the name of the file.

The image data included in the second video file may not be "Null" data and may be such data that allows the user to clearly understand that the data is different from moving image data captured together with sound data. For example, the image data may be replaced with different image data with a note "No main image" or the like.

According to the above exemplary embodiments, sound-pickup accessory 200 has the build-in A/D converter. However, sound-pickup accessory 200 may have no A/D converter. In such a case, digital camera 100 has the A/D converter.

According to the above exemplary embodiments, an output end of external microphone 210 is connected to sound-pickup accessory 200. However, connection to sound-pickup accessory 200 is not limited to this configuration. For example, an output end of a microphone amplifier may be connected to sound-pickup accessory 200.

According to the above exemplary embodiments, the imaging apparatus includes built-in microphone 111. However, the imaging apparatus may include no built-in microphone 111. Specifically, the imaging apparatus (for example, digital camera 100) is applicable when it includes the setting unit (for example, operation unit 180) that accepts setting of a number of channels for sound signals to be recorded, the selector (for example, analog sound processor 115 and digital image and sound processor 120) that selects sound signals having the number of channels, and the control unit (for example, controller 130) that controls recording of the selected sound signals. The control unit is configured to operate such that when the number of channels is set to two at time of recording sound signals, the control unit, according to the first format, records sound data generated based on selected sound signals for two channels, on one sound track included in a video file. The control unit is configured also to carry out at least any one of the following operations (i) to (iii) when the number of channels is set to four.

(i) The control unit, according to the second format different from the first format, records sound data generated based on selected sound signals for four channels, respectively, on four sound tracks included in the video file so that each piece of sound data for one channel is allocated to each of the sound tracks.

(ii) The control unit, according to the first format, records the first sound data generated based on one set of sound signals for two channels selected out of sets of selected sound signals for four channels, in one sound track included in the video file.

The control unit, according to the third format different from the first format, records also the second sound data generated based on the other set of sound signals for two channels selected out of the sets of selected sound signals for four channels, in a sound file.

(iii) The control unit, according to the first format, records the third sound data generated based on one set of sound signals for two channels selected out of sets of selected sound signals for four channels, in the first video file such that the third sound data is associated with the first image data. The control unit, according to the fourth format different from the first format, records also the fourth sound data generated based on the other set of sound signals for two channels selected out of the sets of selected sound signals for four channels, in the second video file such that the fourth sound data is associated with the second image data different from the first image data.

According to the above exemplary embodiment, the control unit is configured to operate such that when the number of channels is set to two at time of recording sound signals, the control unit, according to the first format, records sound data generated based on selected sound signals for two channels, on one sound track included in a video file.

Further, the control unit is configured to operate such that when the number of channels is set to four, the control unit does not record the first sound data generated based on one set of sound signals for two channels selected out of sets of selected sound signals for four channels and the second sound data generated based on the other sets of sound signals for two channels selected out of the sets of selected sound signals for four channels, in two sound tracks included in one video file, respectively, in accordance with the first format.

According to the above exemplary embodiment, the digital camera provided as the imaging apparatus is a camera with an interchangeable lens. However, the digital camera may be a camera having its lens and body integrated together.

The digital camera has been described as the imaging apparatus according to the present disclosure. The imaging apparatus according to the present disclosure, however, is not limited to the digital camera. The imaging apparatus may be provided as electronic equipment different from the digital camera, the electronic equipment being capable of generating a video file including sound data. For example, the imaging apparatus may be provided as a video camera or a smart phone.

In the above, the exemplary embodiments have been described as examples of the technique in the present disclosure. For that purpose, the accompanying drawings and the detailed description have been provided.

Therefore, the components described in the accompanying drawings and the detailed description may include not only the components necessary to solve the problems but also components unnecessary to solve the problems, in order to illustrate the above technique. For this reason, it should not be immediately concluded that those unnecessary components are necessary just because that the unnecessary components are described in the accompanying drawings and the detailed description.

Further, since the above exemplary embodiments illustrate the technique in the present disclosure, various modifications, substitutions, additions and omissions can be performed within the scope of claims and equivalent scope of claims.

INDUSTRIAL APPLICABILITY

The imaging apparatus according to the present disclosure can be applied to various pieces of electronic equipment (video cameras, smart phones, and the like) capable of recording sounds in synchronization with recording of images.

REFERENCE MARKS IN THE DRAWINGS 100 digital camera (imaging apparatus)
102 camera body
111 built-in microphone (first hone)
111L, 111R microphone
112 external input terminal (second input terminal)
113 hot shoe (first input terminal)
115 analog sound processor (selector)
120 digital image and sound processor (control unit, selector)
130 controller (control unit)
143 CCD image sensor
160 recording medium
180 operation unit (setting unit)
190 display unit
200 sound-pickup accessory
210 external microphone (second microphone)
220 external microphone (third microphone)
301 interchangeable lens

The invention claimed is:

1. An imaging apparatus comprising:
a setting unit that accepts setting of a number of channels for sound signals to be recorded;
a selector that selects the sound signals having the number of channels; and
a control unit that controls recording of the selected sound signals,
wherein the control unit is configured to operate at time of recording the sound signals, such that:
when the number of channels is set to two, the control unit, according to a first format, records sound data generated based on the selected sound signals for two channels, on one sound track included in a video file, and
wherein the control unit is configured also to carry out, at time of recording the sound signals, the following operation when the number of channels is set to four:
the control unit, according to the first format, records third sound data generated based on one set of sound signals for two channels selected out of sets of the selected sound signals for four channels, in a first video file such that the third sound data is associated with first image data, and, according to a fourth format different from the first format, records also fourth sound data generated based on an other set of sound signal for remaining two channels selected out of the sets of the selected sound signals for four channels, in a second video file such that the fourth sound data is associated with second image data different from the first image data.

2. The imaging apparatus according to claim 1, wherein the selector includes an analog-to-digital (A/D) converter that subjects the selected sound signals to A/D conversion.

3. The imaging apparatus according to claim 1, further comprising at least one of:
a first microphone that receives incoming sounds to output first sound signals;
a first input terminal configured to receive incoming second sound signals from a second microphone; and
a second input terminal configured to receive incoming third sound signals from a third microphone,
wherein the sound signals include at least any one set of the first sound signals, the second sound signals, and the third sound signals.

4. The imaging apparatus according to claim 3, wherein the first microphone is placed inside the imaging apparatus, and
the first input terminal is a hot shoe configured to connect to an external accessory.

5. The imaging apparatus according to claim 1, wherein the selector includes an analog-to-digital (A/D) converter that subjects the selected sound signals to A/D conversion.

6. The imaging apparatus according to claim 1, further comprising at least one of:
a first microphone that receives incoming sounds to output first sound signals;
a first input terminal configured to receive incoming second sound signals from a second microphone; and
a second input terminal configured to receive incoming third sound signals from a third microphone,
wherein the sound signals include at least any one set of the first sound signals, the second sound signals, and the third sound signals.

7. The imaging apparatus according to claim 6, wherein the first microphone is placed inside the imaging apparatus, and
the first input terminal is a hot shoe configured to connect to an external accessory.

8. The imaging apparatus according to claim 1, further comprising:
a first microphone that receives incoming sounds to output first sound signals;
a first input terminal configured to receive incoming second sound signals from a second microphone; and
a second input terminal configured to receive incoming third sound signals from a third microphone,
wherein the control unit is configured to operate such that when the number of channels is set to four, the control unit, according to the second format, records the sound data generated based on the selected sound signals for four channels, respectively, on the four sound tracks included in the video file so that each piece of sound data for one channel is allocated to a corresponding to one of the sound tracks, and
wherein the sound signals are either a combination of the first sound signals and second signals or a combination of the second sound signals and the third sound signals, the combination being selected by the selector.

* * * * *